United States Patent
Pivit et al.

(10) Patent No.: US 9,113,346 B2
(45) Date of Patent: Aug. 18, 2015

(54) CALIBRATION

(75) Inventors: Florian Pivit, Dublin (IE); Daniel Markert, Schweinfurt (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/635,840

(22) PCT Filed: Mar. 1, 2011

(86) PCT No.: PCT/EP2011/000983
§ 371 (c)(1),
(2), (4) Date: Dec. 4, 2012

(87) PCT Pub. No.: WO2011/113530
PCT Pub. Date: Sep. 22, 2011

(65) Prior Publication Data
US 2013/0079060 A1   Mar. 28, 2013

(30) Foreign Application Priority Data
Mar. 18, 2010   (EP) .................................... 10360014

(51) Int. Cl.
*H04B 1/04* (2006.01)
*H04B 17/00* (2006.01)
*H04B 1/38* (2006.01)
*H04W 24/02* (2009.01)
*H01Q 3/26* (2006.01)
*H01Q 1/24* (2006.01)

(52) U.S. Cl.
CPC ............... *H04W 24/02* (2013.01); *H01Q 1/246* (2013.01); *H01Q 3/267* (2013.01)

(58) Field of Classification Search
CPC ..... H01Q 3/267; H01Q 1/246; H04B 17/0005; H04B 17/0012; H04B 17/0062
USPC ........... 455/101, 103, 114.2–115.2, 125–126, 455/553.1, 561
See application file for complete search history.

(56) References Cited

U.S. PATENT DOCUMENTS

| 4,532,518 A | 7/1985 | Gaglione et al. |
| 5,126,700 A | 6/1992 | Curtin et al. |

(Continued)

FOREIGN PATENT DOCUMENTS

| CN | 1078390 C | 1/2002 |
| CN | 1430823 A | 7/2003 |

(Continued)

OTHER PUBLICATIONS

European Search Report for EP 10 36 0014 dated Oct. 1, 2010.
(Continued)

*Primary Examiner* — Simon Nguyen
(74) *Attorney, Agent, or Firm* — Fay Sharpe LLP

(57) ABSTRACT

An active transceiver array for a wireless telecommunications network. The transceiver array comprises a plurality of calibratable transceiver modules. Each transceiver module comprises a transceiver chain operable to process a primary signal and generate a processed primary signal; a comparator unit operable to compare said primary signal and said processed primary signal to determine a transceiver chain error induced by said transceiver chain in said processed primary signal; and a correction unit which uses the transceiver error to correct said primary signal to be processed by said transceiver chain.

13 Claims, 10 Drawing Sheets

(56) References Cited

U.S. PATENT DOCUMENTS

| | | | |
|---|---|---|---|
| 6,133,868 A | 10/2000 | Butler et al. | |
| 6,236,839 B1* | 5/2001 | Gu et al. | 455/67.14 |
| 6,252,542 B1* | 6/2001 | Sikina et al. | 342/174 |
| 6,339,399 B1* | 1/2002 | Andersson et al. | 342/372 |
| 6,600,935 B1* | 7/2003 | Hiramatsu | 455/562.1 |
| 6,809,685 B2* | 10/2004 | Hancock | 342/368 |
| 7,058,425 B1 | 6/2006 | Takakusaki | |
| 7,209,078 B2* | 4/2007 | Jin et al. | 342/368 |
| 8,045,926 B2* | 10/2011 | Martikkala et al. | 455/63.4 |
| 8,285,221 B2* | 10/2012 | Kundmann et al. | 455/67.14 |
| 8,296,086 B2* | 10/2012 | Sternberg et al. | 702/66 |
| 2005/0239419 A1* | 10/2005 | Fudaba et al. | 455/101 |
| 2008/0007453 A1* | 1/2008 | Vassilakis et al. | 342/368 |
| 2009/0267824 A1* | 10/2009 | Cooper et al. | 342/174 |

FOREIGN PATENT DOCUMENTS

| | | |
|---|---|---|
| CN | 101479885 A | 7/2009 |
| EP | 1 178 562 A1 | 2/2002 |
| EP | 1 473 798 A1 | 11/2004 |
| EP | 1630976 A1 | 3/2006 |
| EP | 1 204 161 B1 | 8/2008 |
| JP | 2000-151255 | 5/2000 |
| JP | 2001-53527 | 2/2001 |
| WO | WO 95/34103 A1 | 12/1995 |

OTHER PUBLICATIONS

Notice of Reason for Refusal of corresponding Japanese Application No. 2012-557431, dated Jul. 8, 2014, 6 pages.

Office Action of corresponding Chinese Application No. 201180013094.0, dated Nov. 17, 2014, 15 pages.

* cited by examiner

CALIBRATION

FIELD OF THE INVENTION

The present invention relates to an active transceiver array and a method of calibrating an active transceiver array.

BACKGROUND

Wireless telecommunications systems are known. In a cellular system radio coverage is provided in areas known as cells. A base station is located in each cell to provide radio coverage. Traditional base stations provide coverage in relatively large geographical areas and the cells are often referred to as macro cells.

A typical base station comprises: a control centre at ground level, a radio mast and an array of antenna located on the mast. The array of antenna operates to provide radio coverage to end users within the cell by transmitting signals to, and receiving signals from, end users within the cell. In such a typical base station the base station control centre contains, amongst other things: a data management unit, a digital to analogue converter, a filter and a power amplifier. Housing those items in the control centre at ground level allows those components of the system to be substantially protected from prevailing environmental conditions, such as precipitation or temperature fluctuation.

Analogue radio frequency (RF) signals generated in the control centre at ground level are communicated to each antenna element making up the antenna array via coaxial cable extending from the control centre at the base of the radio mast to the antenna array provided near the top of the radio mast. In a "passive" array the RF signal supplied to each antenna element is substantially identical; provision may be made in the antenna array for a fixed phase shift across the array to be introduced to the signal to be transmitted by the array. Such a phase shift across the array allows redirection of wave fronts produced by the array, also known as "beam forming". An array which performs such a fixed phase shift, irrespective of signal, may be known as a "passive" system. That phase shift may be introduced by a physical tilt or other appropriate arrangement of each of the antenna elements comprising the array.

A passive antenna array introduced a fixed phase difference across an antenna array to all radio frequency signals conveyed by that array to an end user. In contrast, an "active" antenna array is able to introduce a phase shift across the antenna array appropriate to the location one or more end users receiving a signal. An active antenna array is able to simultaneously shift different signals for different end users by introducing different phase shifts. In particular, an active antenna array is able to make use of linear superposition of radio waves to transmit, for example, a high power signal to an end user a large distance from the array and a lower power signal to an end user closer to the array simultaneously by introducing different phase shifts across the array for each of those signals.

An active antenna array can thus be understood to function as a set of several parallel lower power transceiver chains which operate in a parallel manner. The parallel transceiver chains enable dynamic beam forming of transmissions to end users. It will be understood that each transceiver chain or transceiver module within such a transceiver array is directly fed with a signal according to the user equipment being served by the base station.

In any antenna array system consisting of a multitude of transceiver chains, and particularly when that array is used to generate a specific beam pattern, some degree of calibration of each transceiver chain may be necessary. Calibration ensures that the required phase and amplitude weighting of the set of signals to be transmitted to user equipment across the array can be ensured. It will be understood that, as a result of performance variations in components, temperature drift, ageing, and other variations, each transceiver chains in an array will induce a complex aberration in the signal as it passes through the chain and that each transceiver chain in an array will display non-linear behaviour. The signals at the output of each transceiver chain will vary in phase and amplitude, even if the input signals at the individual transceiver chains are identical. It is therefore required to calibrate such an array system.

It is desired to provide a calibration method for use in an improved active transceiver array.

SUMMARY

Accordingly, a first aspect provides an active transceiver array for a wireless telecommunications network comprising:
a plurality of calibratable transceiver modules,
each transceiver module comprising:
a transceiver chain operable to process a primary signal and generate a processed primary signal;
a comparator unit operable to compare said primary signal and said processed primary signal to determine a transceiver chain error induced by said transceiver chain in said processed primary signal; and
a correction unit which uses the transceiver error to correct said primary signal to be processed by said transceiver chain.

An array system, comprising a multitude of transceivers and, in particular, a plurality of antennas, may be used to generate a specific pattern and also to form beams. Beam forming requires calibration of the array of transceivers to ensure that the required phase and amplitude weighting of the signals can be ensured. There may be performance variations in components, temperature drift or ageing of each transceiver chain and thus each transceiver chain may induce a different variation or aberration in the signal to be transmitted. It will therefore be understood that an array may display non-linear behaviour across a set of transceiver chains.

As a result, the signals at the output of the transceiver chains transmitted by antenna may vary in phase and amplitude in a manner which is not intended and that the required beam forming may be not achieved in an optimum manner. In order to ensure that an array operates in accordance with intention, an array system may be calibrated.

Various calibration methods are possible. Possibilities in relation to the transmit path include calibration by sending a test signal through each transmitter chain in an array comparing the signals at the output of the transceiver chain with what is expected.

The comparison may be done in a number of ways. For example, a test signal may be sent to each transceiver chain in an array in sequence and the signal transmitted over air by each transceiver chain may be compared to an output signal of one of the other transceiver chains (by an appropriate summation method). Alternatively, each output signal may be compared to a known reference or "test" signal. One possible problem associated with such calibration methods is that the array system must be taken offline in order to be calibrated. The system may need to be taken offline because a test signal may be sufficiently different to a typical operational signal, thereby causing various operational limits to be exceeded (such a situation occurs mostly whilst calibrating the transmission mode of an array). Another problem may be that the injection of a test signal into a receiver may disable reception of a signal to be received. Such is the intrusive effect of such calibration methods that they are primarily applicable to systems which can successfully be taken offline or calibrated in a factory environment, for example, phased arrays in radar systems. That approach is less feasible in respect of active antenna systems used in mobile telecommunications, where an antenna array is exposed to a constantly changing environmental condition, for example, changes in temperature and changes in weather, and furthermore wireless telecommunications systems typically require a high level of availability in order to provide continuous service to customers.

A general calibration method for a transmission path may take the form of providing a sampling receiver near to, or in, an antenna array, which determines phase and amplitude of a test signal transmitted from each individual transceiver chain in an array. A test signal is sent to each chain in the array in turn, and received by the dedicated sampling receiver. Such a method uses the actual signal transmitted by a chain over the air interface. The information relating to measured phase and amplitude from the dedicated sampling receiver is sent to a central unit which operates to send a phase and amplitude adjustment command to a digital processing unit or an RF phase and amplitude adjustor in each individual transceiver chain. That general process is repeated for all transmitters 1 to N until phases and amplitudes of each provided transceiver chain have reach required levels.

It is possible to sample a transmitted signal via a test antenna element. Such an arrangement may not necessarily be performed during normal operation of an antenna array since, if all elements from 1 to N are fully operational it is not possible for a receiver to determine the phase of a transmitted signal from an individual antenna element. That is to say, at test receiver may not necessarily be able to determine between signals from different antenna elements. In such an arrangement a signal is sent over the air, as in normal operation, and each element of an array is configured individually on the basis of a signal received by a test signal receiver. It will be understood that an antenna array must be taken offline and no data traffic can be handled during such a calibration method.

Rather than use transmission over the air, it is possible to calibrate an array using a coupler and switch method. In such an arrangement, rather than use a signal transmitted over the air by an antenna, a coupler is used to sample the signal to be sent by the antenna just before it is sent. The signal is therefore typically a radio frequency analogue signal. In such an arrangement, using a common central unit, and comparator, it is necessary to use a highly accurate switch. The phase and accuracy of such a switch and of the lines between the coupler and the comparator unit for each of the elements in an array are highly critical and the cost of accurate cables and switches with multiple inputs for large arrays can be particularly expensive.

It is possible to use a receiver provided in the far field in order to calibrate an array. Such an approach allows for very precise phase and amplitude measurements since no coupler or measurement lines are required. Such a process may, however, be applied in a factory of laboratory environment, since provision of a sampling antenna in the far field is required and an element by element calibration is necessary. Such an approach may not be applied cost effectively in a mass production environment. Furthermore, a recurring calibration process in accordance with the far field method is not possible once an antenna array has been deployed in the field.

Accordingly, the first aspect provides an active transceiver array in which each module is provided with a comparator unit. Although it may at first appear that provision of a comparator module at each module unnecessarily complicates the apparatus and construction of an array in comparison to a common comparator unit, such an arrangement can offer significant constructional advantages. An arrangement in accordance with the first aspect requires minimal hardware, for example, an RF comparator device) and minimal processing resource compared to other calibration schemes which may require dedicated receivers and/or signal processors and expensive hardware and/or computational resources. Provision of a comparator at each module reduces the need for a high number of phase stable distribution arrangements, since the comparison is done close to each module and the determined transceiver chain error calculated by the comparator device may then be more reliably communicated between components of an array calibration control system.

Furthermore, provision of a comparator unit in each module facilitates the use of a real modulated data traffic signal for calibration purposes. As a result, each module, and thus the array as a whole, may be calibrated during operation without the need to emit a test signal. Such a dynamic and responsive calibration is advantageous in a wireless telecommunications system, where compliance with standards and an extraordinary high reliability and availability of an array system may be desired to ensure user equipment service level can be maintained.

Furthermore, it will be understood that provision of a comparator unit in each module allows an array to be successfully scaled without undue burden, whilst still maintaining calibrated operation. Such a possibility is not necessarily possible in a dedicated common unit comparator calibration arrangement.

In one embodiment, the transceiver array further comprises a primary signal generation unit operable to generate a different primary signal for each of the plurality of transceiver modules. Accordingly, each module in an array may be provided with a different primary signal, thereby to achieve required beam forming.

In one embodiment, the transceiver array further comprises a phase stable distribution element operable to distribute the primary signal to each of the plurality of transceiver modules. In one embodiment, the phase stable distribution element is operable to distribute the primary signal to the comparator unit of each of the plurality of transceiver modules. Accordingly, by utilizing a phase stable distribution device it will be appreciated that the signal distribution network does not itself contribute to aberration in a manner which serves to affect comparator operation.

In one embodiment, the phase stable distribution element is operable to distribute the same said primary signal to said comparator unit of each of said plurality of transceiver modules. Accordingly, whilst a different primary signal may be distributed to each of the modules for transmission, the same signal may be transmitted to each of the module comparator modules. A relevant comparison for calibration purposes may then only be made in the module to which the primary signal distributed to module comparators relates. Such an arrangement may simplify the hardware of an array according to the first aspect.

In one embodiment, the phase stable distribution network comprises a standing wave line.

A standing wave line may comprises a feed arrangement including a waveguide of a predetermined length, which is coupled to a reference signal source, and which is terminated at one end in order to set up a standing wave system along its length, and a plurality of coupling points at predetermined points along the length of the waveguide, which are each coupled to a said comparison means of a respective said radio element.

Accordingly, it is possible to provide an accurate distribution mechanism for phase and amplitude reference signals for calibration of active antenna arrays for mobile communications. Such a distribution mechanism is mechanically robust and cost-effective.

In one embodiment, a reference source signal of phase and/or amplitude is coupled to a finite length of a transmission line, which is terminated such as to set up a standing wave within the transmission line length. For a length of transmission line or other waveguide terminated at one end with an impedance which substantially matches the waveguide characteristic impedance, radiated travelling waves will progress along the line and be absorbed in the terminating impedance. For other terminations however, some radiation will not be absorbed, but be reflected from the end, and will set up a standing wave system, where the resultant wave amplitude changes periodically along the length of the waveguide (there will in addition be time variation of the voltage value at each point along the line as a result of wave oscillation/phase rotation). The amount reflected depends on the terminating impedance, and in the limiting cases of short circuit and open circuit, there will be a complete reflection. In other cases, there will be partial reflection and partial absorption.

The standing wave signal may be sampled at predetermined tapping or coupling points along the length of the line, which all have the same amplitude and phase relationships, or at least a known relationship of phase and amplitude. Such coupling points may occur at or adjacent voltage maxima/minima within the standing wave, where the change of voltage with respect to line length is very small. Accordingly, the requirement for mechanical accuracy in positioning of the coupling point can be reduced compared with a star-distribution network arrangement.

In one embodiment, the coupling points are each connected by a respective flexible short length of line of accurately known length to respective comparators in respective transceiver elements (more generally radio elements). Short lengths of flexible cable, all of the same length, may be formed very accurately as compared with a star-distribution network.

In one embodiment, the waveguide may be formed as a plurality of sections of waveguide of predetermined length, interconnected by releasable couplings: such an arrangement permits scaling to any desired size of antenna.

A standing line distribution network is of particular use for frequencies of the order of GHz, usually up to 5 GHz, that is microwave frequencies in the mobile phone allocated bands, where coaxial cable is generally used as a transmission line. However, it may also be applicable to other frequencies, greater and smaller, and coaxial cable may be replaced by other waveguide and transmission line constructions such as hollow metallic waveguides, tracks on a printed circuit, or any other construction.

In one embodiment, the transceiver chain comprises a digital to analogue converter and an antenna element, and each module further comprises a coupling, operable to couple the transceiver chain to the comparator unit, the coupling being provided between the digital to analogue converter and the antenna element. Accordingly, by providing a comparator unit for each module and by ensuring the required connector between the transceiver chain and the comparator is of minimal length, the contribution of that connector to the measured transceiver chain error may be minimized. Placing the coupling between the analogue converter and the antenna may allow the sampled signal sent to the comparator to be as similar as possible to the signal that is actually transmitted by an antenna element of a module. That arrangement ensures that as much of the aberration induced by a transceiver chain can be accounted for and that calibration can be as full and accurate as possible.

In one embodiment, the correction unit comprises a digital signal modification unit. In one embodiment, the correction unit comprises an RF phase and amplitude adjuster. Accordingly, calibration steps may be taken whilst a signal is in a digital or analogue phase. Furthermore, if both devices are provided, correction steps may be taken in a combination of digital or analogue phases.

A second aspect provides a calibratable transceiver module forming part of an active transceiver array in a wireless telecommunications network, comprising:
  a transceiver chain operable to process a primary signal and generate a processed primary signal;
  a comparator unit operable to compare the primary signal and the processed primary signal to determine a transceiver chain error induced by the transceiver chain in the processed primary signal; and
  a correction unit which uses the transceiver error to correct the primary signal to be processed by the transceiver chain.

In one embodiment, the transceiver chain comprises a digital to analogue converter and an antenna element and the module further comprises a coupling, operable to couple said transceiver chain to the comparator unit, provided between the digital to analogue converter and the antenna element.

In one embodiment, the transceiver chain comprises a digital to analogue converter and an antenna element, and each module further comprises a coupling, operable to couple the transceiver chain to the comparator unit, the coupling being provided between the digital to analogue converter and the antenna element. Accordingly, by providing a comparator unit for each module and by ensuring the required connector between the transceiver chain and the comparator is of minimal length, the contribution of that connector to the measured transceiver chain error may be minimized. Placing the coupling between the analogue converter and the antenna may allow the sampled signal sent to the comparator to be as similar as possible to the signal that is actually transmitted by an antenna element of a module. That arrangement ensures that as much of the aberration induced by a transceiver chain can be accounted for and that calibration can be as full and accurate as possible.

In one embodiment, the correction unit comprises a digital signal modification unit. In one embodiment, the correction unit comprises an RF phase and amplitude adjuster. Accordingly, calibration steps may be taken whilst a signal is in a digital or analogue phase. Furthermore, if both devices are provided, correction steps may be taken in a combination of digital or analogue phases.

A third aspect provides a method of calibrating an active transceiver array in a wireless telecommunications network comprising a plurality of transceiver modules,
  the method comprising the steps, for each module, of:
  processing a primary signal in a transceiver chain to generate a processed primary signal;
  comparing the primary signal with said processed primary signal using a comparator unit to determine a transceiver chain error induced by the processing of the primary signal by the transceiver chain; and
  correcting the primary signal to be processed by the transceiver chain using the determined transceiver chain error.

It will be appreciated, that all aspects, including the first and second aspects, may be implemented in either the transmit path or reception path of a transceiver module forming part of an active transceiver array. All aspects may be particularly useful and applicable to the transmit path.

In one embodiment, the primary signal comprises a traffic signal. Accordingly, the method may be implemented using a data traffic signal for transmission to user equipment. As described above in relation to the first aspect, it will be appreciated that use of a comparator unit in each module facilitates the use of a real modulated data traffic signal for calibration purposes. As a result, each module, and thus the array as a whole, may be calibrated during operation without the need to shut down operation to emit a test signal. Such a dynamic and responsive calibration is advantageous in a wireless telecommunications system, where compliance with standards and an extraordinary high reliability and availability of an array system may be desired to ensure user equipment service level can be maintained.

In one embodiment, the method steps are repeated consecutively for each module forming part of the transceiver array. Accordingly, one module forming part of the array may be calibrated at a time by applying a calibration method to each module in sequence. It may be possible, in one embodiment, to perform the method steps concurrently for each module forming part of an array. Furthermore, in one embodiment, the calibration steps are periodically repeated. Periodic repetition may allow dynamic or substantially continuous calibration of an array, thereby allowing a rapid response to environmental conditions affecting operation of the array.

In one embodiment, the primary signal comprises a test signal. Accordingly, it will be appreciated that the array, module and method of the various aspects described may be utilized in commissioning a system or in a factory calibration of a system. The test signal may be a continuous wave, the continuous wave may be sinusoidal.

In one embodiment, the primary signal comprises a sinusoidal test signal, and the method further comprises the steps of:

sweeping the sinusoidal test signal in frequency and, based on the determined transceiver chain error, determining a phase length of the transceiver chain.

Accordingly, it will be appreciated that by calculating the deviation of phase change over frequency it is possible to determine a group delay of the signal chain. Such a calculation may be used to compensate for group delay in the digital domain and thereby improve signal quality of the transmitted signal.

Further particular and preferred aspects of the present invention are set out in the accompanying independent and dependent claims. Features of the dependent claims may be combined with the features of the independent claims as appropriate, and in combinations other than those explicitly set out in the claims.

BRIEF DESCRIPTION OF THE DRAWINGS

Embodiments of the present invention will now be described further, with reference to the accompanying drawings, in which.

DESCRIPTION OF THE EMBODIMENTS

Figure 1:
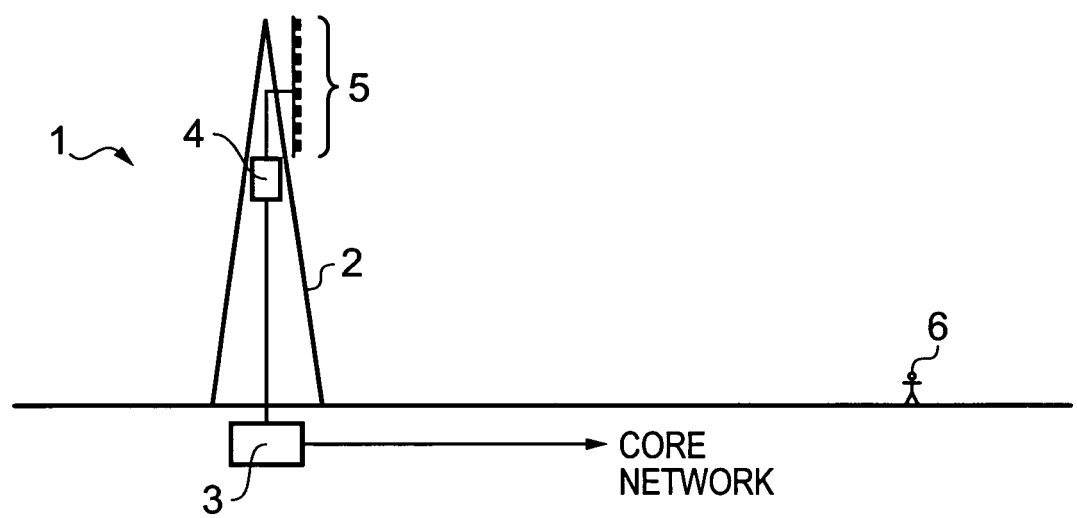
FIG. 1 illustrates schematically the main components of a wireless network base station.

FIG. 1 illustrates schematically the main components of a wireless communications network base station 1. The base station 1 comprises: a radio mast 2 and a data management unit 3 which communicates with a "core network" of the wireless communications network. The base station further comprises a processing unit 4 and an active antenna 5 operable to transmit radio frequency signals to, and receive radio frequency signals from, end users 6 in response to information received from the core network.

Figure 2:
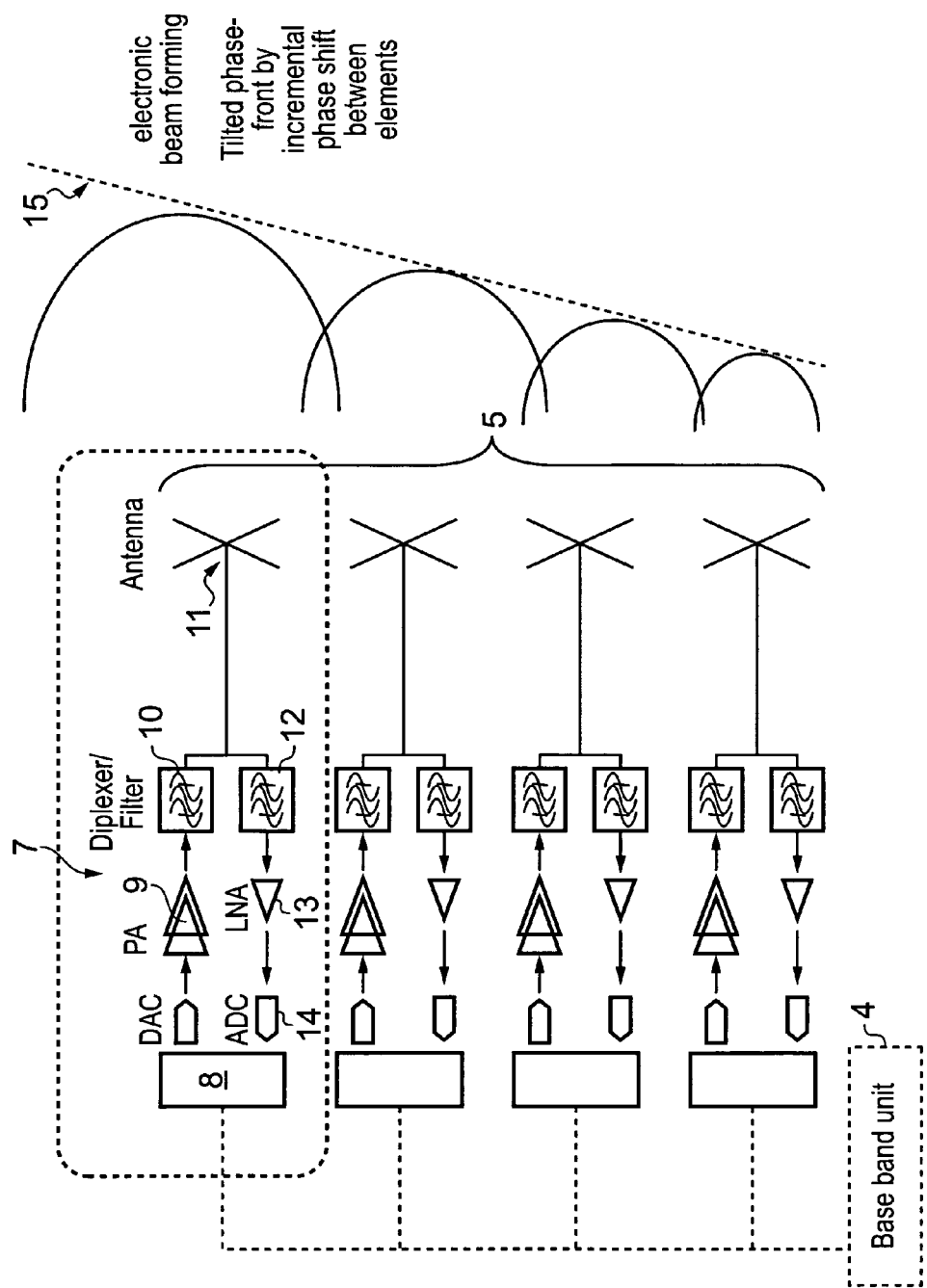
FIG. 2 illustrates schematically the main components of an active antenna array for use in a base station such as that shown in FIG. 1.

FIG. 2 illustrates schematically the main components of an active transceiver array for use in a base station such as the one shown in FIG. 1. The active transceiver array may also be referred to as an "active antenna array". An active transceiver array 5 comprises a set of substantially identical transceiver chains 7. In FIG. 2, four active transceiver chains 7 are shown. Each active transceiver chain comprises transmission and reception apparatus. In the active transceiver array shown, each transceiver chain comprises: a radio transmitter 8 including a digital to analogue converter, a power amplifier 9, a filter or diplexer 10 and an antenna element 11 in the transmission chain. In the reception chain the transceiver comprises: an antenna element 11, a diplexer or filter 12, a low noise amplifier 13 and an analogue to digital converter forming part of a receiver.

A simplified explanation of the operation, in transmission mode, of a base station similar to that shown in FIG. 1 follows. Although reference throughout is made primarily to a transmit path, it will be appreciated that an analogous approach may be implemented in respect of a reception path. A data management unit 3 receives digital information relating to a signal to be transmitted to a user 6 from the core network. The information received by the data management unit is transferred, via a digital connector, to processing unit 4. Processing unit 4 acts to dynamically generate signals to be transmitted by each of the active transceiver elements 7 forming the active transceiver array 5. It is processing unit 4 that calculates, for each signal to be transmitted to user 6, an appropriate phase shift to introduce across the active transceiver array 5 to ensure correct resultant beam forming. A calculated digital signal is generated by processing unit 4 for each element 7 and transmitted via a digital connection to each of those elements.

The signal received by each element 7 is converted by radio transmitter 8 into a radio frequency analogue signal. The radio frequency signal is fed to power amplifier 9 and then filtered by a frequency filter 10 before being passed to the antenna element 11 for transmission to end user 6. In the arrangement shown schematically in FIG. 2, it can be seen that by introducing an incremental constant phase shift between the digital signal transmitted by processing unit 4 to each of the four elements 7 forming the array 5, the resultant signal is electronically beam-formed and the array is operable to transmit a signal having a tilted phase front 15.

It will be understood that in an array system capable of such beam forming, it is necessary to calibrate each of the transceiver modules 7 to ensure that the phase and amplitude weighting of the signal actually transmitted match the intended phase and amplitude of the signal which it is intended to transmit. Furthermore, it will be appreciated that, due to performance variations in components, temperature drift and/or ageing, transceiver chains forming part of each element act to induce aberration in a signal which are non-linear even if the input signals of the individual transceiver chains are identical. To compensate for those differences, it is necessary to calibrate the system. Once the aberration in each transmitted signal is known, it is possible to adjust the system accordingly, to compensate for the aberration which is induced by the transceiver chain, such that the resulting phase and amplitude of the transmitted signal matches that which is intended to be transmitted.

Figure 3:
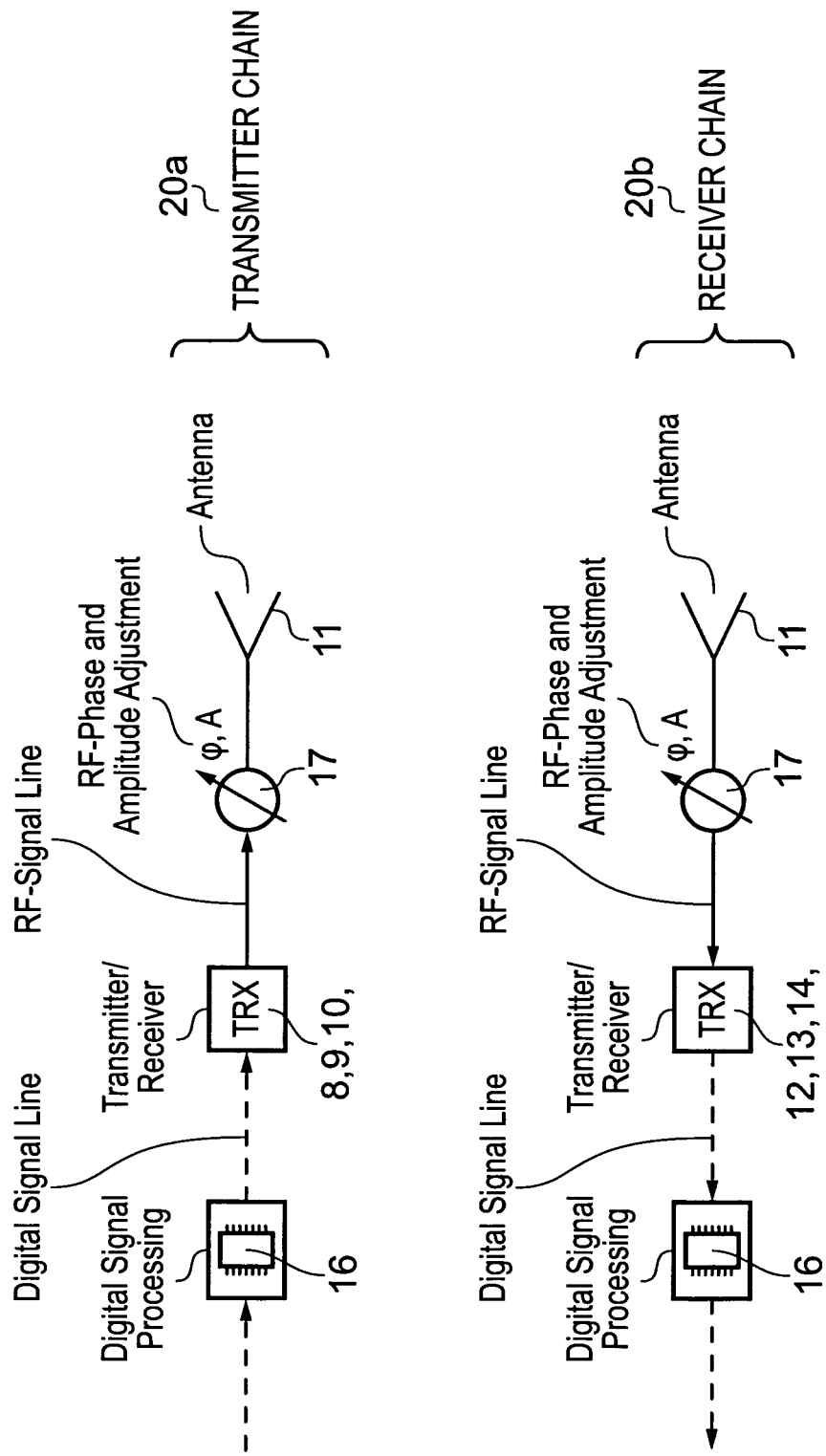
FIG. 3 illustrates schematically embodiments of a transmitter chain and a receiver chain for use in an active array similar to that shown in FIG. 2.

FIG. 3 illustrates schematically embodiments of a transmitter chain and a receiver chain for use in an active array similar to that shown in FIG. 2. Transmitter chain 20a comprises a transceiver containing: a digital analogue converter, power amplifier and diplexer filter (9, 10, 11 respectively) and antenna element 11. Transmitter chain 20a may further include means to adjust the phase and amplitude of the signal transmitted by antenna element 11, that adjustment being for the purposes of calibration. The adjustment can be achieved either by applying appropriate amplitude and phase modification settings in digital signal processing 16 to a digital signal. Alternatively, or additionally, adjustment may be applied whilst the signal is in an analogue phase by using a radio frequency phase and amplitude adjuster 17. A combination of digital and analogue phase adjustment techniques may be applied as appropriate to achieve calibration.

Receiver chain 20b comprises a receiver including a filter, low noise amplifier, an analogue to digital converter (12, 13, 14 respectively) and antenna element 11. Again, adjustment to the phase and amplitude of a signal may be may be achieved through use of either one of, or a combination of, a radio frequency phase and amplitude adjuster 17 provided for use while the signal is in an analogue phase, or by appropriate use of digital signal processing in a digital signal processor 16 provided once the signal has been converted to the digital phase.

Figure 4:
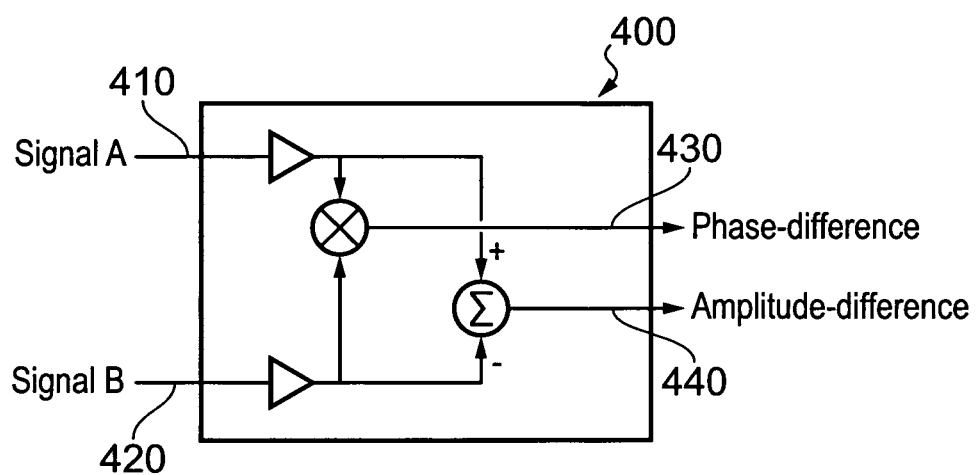
FIG. 4 illustrates schematically an example comparator device for use in calibration of a transceiver module.

FIG. 4 illustrates schematically an example comparator device for use in calibration of a transceiver module. Calibration of transceiver chains may be achieved by implementing a method in which signal powers are nulled. This technique may result in effective and accurate calibration of transceiver modules. It is possible to use such a method and utilise actual data traffic signals transmitted or received by each individual antenna element 11 to calibrate each transceiver module in an active array. Such a method requires that an exact copy of the radio frequency output signal is provided via a phase stable reference distribution to a phase and amplitude comparator such as that shown in FIG. 4. A phase and amplitude comparator 400 is operable to compare a sample of the actual output radio frequency signal to be transmitted by antenna element 11 (that signal being represented in FIG. 4 as signal 410) with a phase stable reference signal 420 provided directly to the comparator 400.

The result of the comparison carried out by comparator 400 is a delta output relating to phase and a delta output relating to amplitude. The phase difference delta value is illustrated as signal 430 in FIG. 4. The amplitude difference is represented as signal 440. It will be appreciated that the input to a transceiver chain can be adjusted using either the radio frequency phase and amplitude adjuster 17 or digital signal processor 16 shown in FIG. 3 until it is determined that the delta outputs for phase and amplitude at the comparator 400 have reached zero. Once that occurs, the antenna will be transmitting substantially what it is expected to transmit, and thereby may achieve substantially optimum operation.

It will be appreciated that use of a data traffic signal may allow for dynamic and substantially continuous calibration of modules forming an array to be carried out.

A comparator 400 such as that shown in FIG. 4 typically receives two input signals 410, 420 which are each buffered and amplified in a log-mag-amplifier. Subsequently a mixing process is performed, which results in a calculated phase difference between signals 410 and 420 in the form of a DC output voltage which changes in magnitude according to phase offset between the two signals. As a result of a summation of the two signals 410, 420, the amplitude difference may also be represented by a DC voltage 440. Such a process works for both continuous wave signals and also modulated signals. As a result, if the signals 410, 420 are modulated but identical and show a constant phase and amplitude offset, the offset in phase amplitude can be represented by two constant DC output voltages.

The two independent output voltages 430, 440 representing phase and amplitude differences can be used in a closed feedback loop to adjust the phase and amplitude signal of a signal sent to each transceiver module until the actual transmitted signal has the same phase and amplitude as is intended. It will, of course, be understood that phase and amplitude comparison can be implemented in various other configurations, for example, by sampling and digitising the two input signals 410, 420 and determining the phase and amplitude offset in the digital domain.

Figure 5:
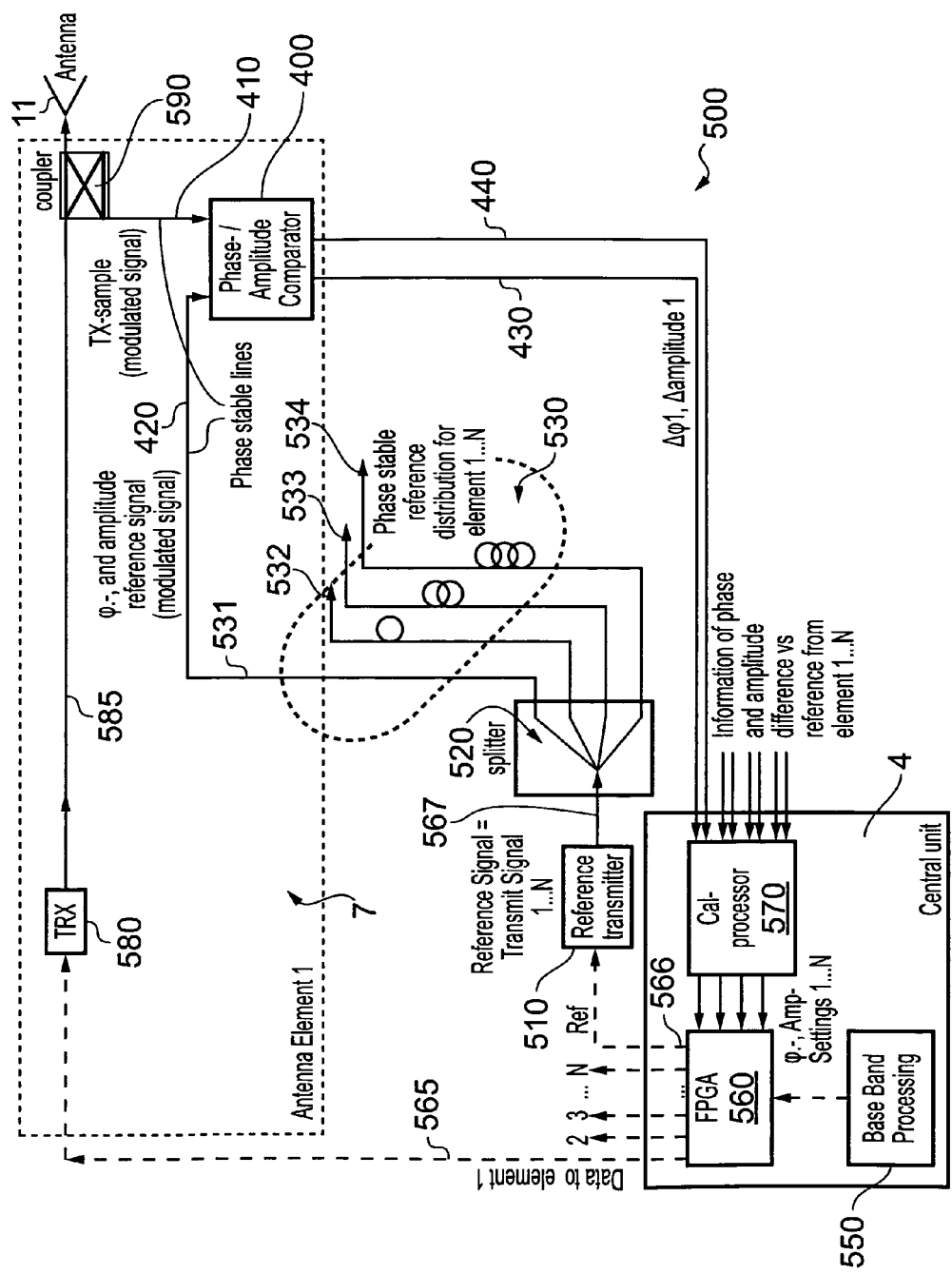
FIG. 5 illustrates schematically a calibratable transceiver module and active array architecture according to one embodiment.

FIG. 5 illustrates schematically a calibratable transceiver module and active array architecture according to one embodiment. Calibration apparatus 500 shown in FIG. 5 is operable to be calibrated using a replica of its own modulated signal during operation. Calibration apparatus 500 comprises: processing unit 4, transceiver module 7, reference transmitter 510, splitter 520, and a phase table reference distribution element 530. Central processing unit 4 comprises a base band processor 550, a field programmable gate array (FPGA) 560 and a calibration processor 570. Transceiver module 7 comprises transceiver chain 580, antenna element 11, and a phase and amplitude comparator unit 400. Transceiver module 7 further comprises a signal sampling coupler 590.

Base band processor 550 provided in central processing unit 4 operates to allocate data to be transmitted according to available resources, for example, in accordance with frequency band, code domain, and time slot, dependent upon chosen transmission scheme, for example, W-CDMA. After performing that allocation, base band processor 550 passes data to FPGA 560. FPGA 560 operates to generate, from the base band data stream, a data stream for each individual transceiver module.

In FIG. 5 only one transceiver module 7 is shown for the sake of clarity. It will be appreciated there may be any number of transceiver modules 7 from one to N. FPGA 560 sends a data stream for transmission by transceiver module 7 to that transceiver module. The data stream is shown schematically in FIG. 5 as digital signal 565. Once digital signal 565 reaches transceiver module 7 it is converted to an analogue radio frequency signal by transceiver 580. The resulting radio frequency signal 565 is fed to antenna element 11. Just before antenna element 11, a coupler 590 is provided. Radio frequency transmission signal 585 is sampled by coupler 590. That sample is passed to phase and amplitude comparator 400. It will be understood that the sample signal is the first input 410 for the purposes of calibration.

Calibration processor 570 provided in central processing unit 4 determines which of the provided transceiver modules is to be calibrated at any given moment. In the arrangement shown in FIG. 5, the calibration processor 570 chooses to calibrate transceiver module 7 (also known as the first module in this particular arrangement). The calibration processor 570 is in communication with FPGA 560 and, when calibration processor 570 wishes to calibrate the first element, the FPGA is instructed to send an exact digital copy of an unmodified signal to be sent to the first element to the reference transmitter 510. The digital copy of the signal 565 is shown schematically in FIG. 5 as digital signal 566. Digital reference signal 566 is converted into a radio frequency signal by reference transmitter 510. The analogue reference signal 567 is divided in a splitter 520 and carried forward to each individual transceiver module by a phase stable reference distribution 530. In the embodiment shown in FIG. 5, the phase stable reference distribution is a star network with N cables of equal length. Analogue signal 567 is carried to transceiver module 7 by cable 531. It will be understood that cables 532, 535 and 534 of the star distribution network would feed to transceiver modules 2, 3 and 4 respectively but that those modules are not shown in FIG. 5 for reasons of clarity.

It is possible to use various phase stable distribution elements, 530. In particular, in some embodiments it is possible to use a phase stable distribution element as described in more detail in relation to FIGS. 7 to 13.

Returning to the embodiment shown in FIG. 5, signal 567 is used as the second input 420 to phase amplitude comparator 400 provided in transceiver module 7. Phase and amplitude comparator 400 then operates as described in relation to FIG. 4 to generate phase difference and amplitude difference signals 430, 440. Those phase difference signals are communicated to calibration processor 540. The phase difference and amplitude difference signals are used by the calibration processor to determine phase and amplitude offset to be applied to the signal 565 for transmission. The offset values calculated by calibration processor 570 are communicated to FPGA 560 where a phase and amplitude offset of the output signal 565 are applied until the measured phase and amplitude variation of the antenna module has reached the desired threshold, typically zero.

It will be understood that calibration processor 570 may repeat the process for all antenna modules forming part of the array. That process typically occurs for each module consecutively.

Furthermore, it will be appreciated that all initial phase and amplitude offsets (due to differences in the antenna connector or line lengths of the reference distribution 530) can be determined via a factory calibration. Those factory calibration factors, which will typically take the form of common offsets, may be stored inside the antenna array processing unit 4 and can be fully taken in account when the FPGA calculates phase and amplitude corrections to be applied due to variations in transceiver chains of the transceiver modules.

One advantage of a method and apparatus as described in relation to FIG. 5 is that there are no switches required to sample the test signal. Furthermore, in the case where an analogue phase and amplitude comparator is used, no dedicated test receiver is required. As a result, phase and amplitude comparison may be achieved in a cost effective manner using mixing and summation processes of two radio frequency signals. A calibration processor and apparatus such as that shown in FIG. 5 takes into account all varying static and delay shifts in the entire digital to radio frequency up-conversion process into account. Even if no factory calibration is performed, the phase and amplitude uncertainty is a result of the connection between the sample coupler 590 and the antenna element 11 and the variations in the reference signal distribution 530.

The calibration concept illustrated in FIG. 5 is not only suited to perform measurements with a broadband modulated signal and can, of course, be used with a sinusoidal test signal generated by base band processor 550 and implemented by FPGA 560. It will be understood that such a sinusoidal signal can be swept in frequency and phase length of a transmission chain can be measured over the frequency. By calculating deviation of phase change over a frequency sweep it is possible to determine the group delay of the signal chain. Such a calculation can be used to compensate for the group delay in the digital domain in order to improve signal quality of the signal to be transmitted by the array.

Figure 6:
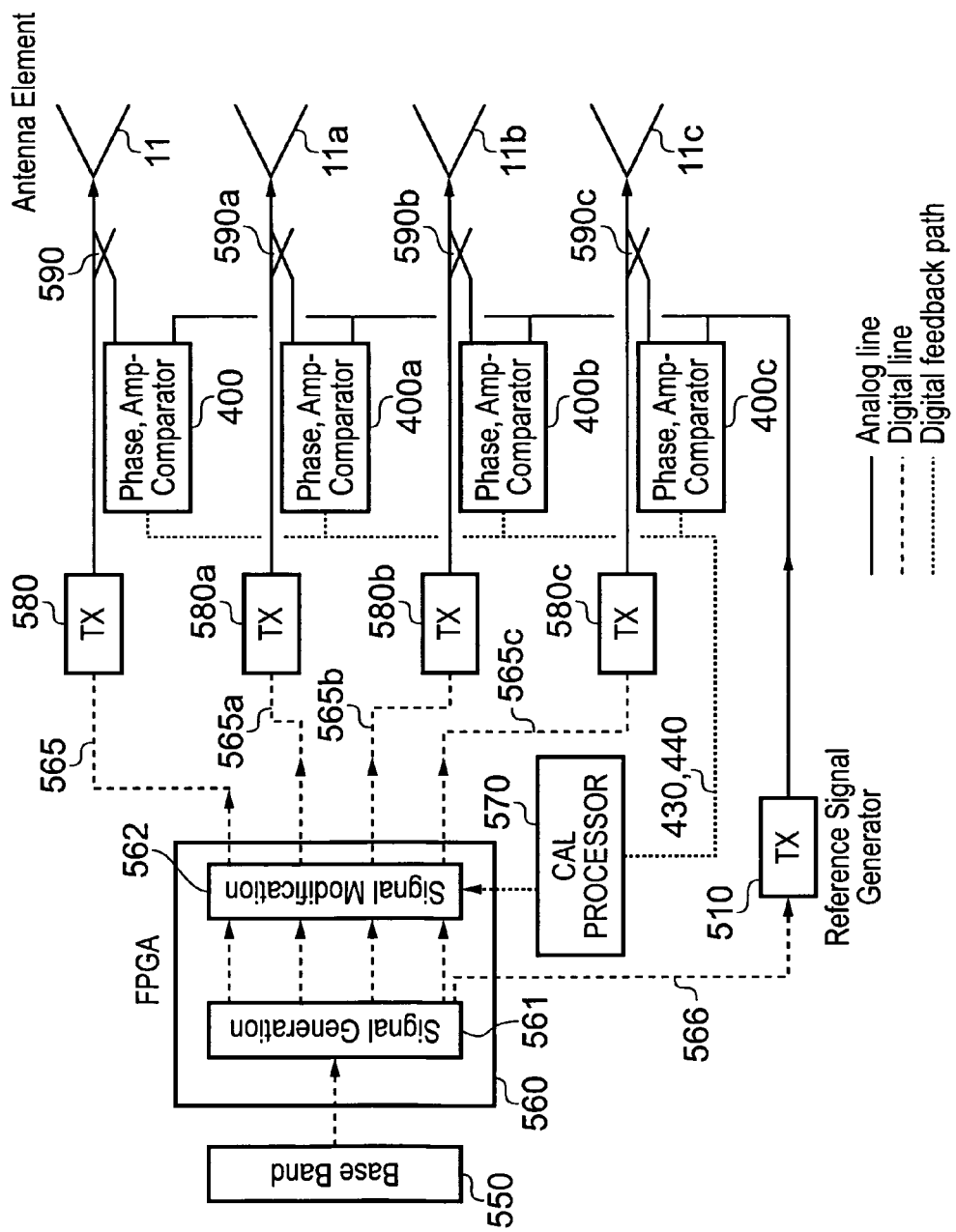
FIG. 6 illustrates schematically an array of four transceiver modules and active array architecture according to one embodiment.

FIG. 6 illustrates schematically an array of four transceiver modules and active array architecture according to one embodiment. It will be appreciated that many of the features shown in FIG. 5 are also present in the embodiment of FIG. 6 and that identical reference numerals have been utilised where appropriate. When a component is provided in each of the four modules shown in FIG. 6, the reference numerals have been amended and now include a suffix a, b, c as appropriate. For example, the transceiver unit of the first module is referred to as 580, the transceiver unit of the second module as 580a, the third module as 580b, and the final module as 580c. Furthermore, the particular architecture shown in FIG. 6 and the nature of the signals being transmitted around the array are indicated in accordance with the following code: a solid line indicates an analogue line, transmitting an analogue signal. In the particular embodiment shown that analogue signal will typically be a radio frequency signal. The dashed line of FIG. 6 represents digital lines carrying a digital signal. The dotted line indicates a digital signal and, in particular, in the embodiment shown in FIG. 6, the dotted line indicates a digital feedback path which leads from phase and amplitude comparator devices 400, 400a, 400b, 400c to calibration processor unit 570.

FIG. 6 illustrates a particular schematic construction of FPGA unit 560 in more detail. FPGA unit 560 comprises a signal generation unit 561 and a signal modification unit 562. It will be understood that signal generation unit 561 acts to generate a signal to be transmitted by each module and it is this signal 566 that is sent to reference signal generator and that is compared with the signal to be transmitted by each transceiver chain by antenna elements 11 and 11a to 11c. Calibration processor 570 sends relevant calibration messages to signal modification unit 562 and that signal modification unit operates to change the signal generated by the signal generation unit to compensate for aberrations induced by the transceiver chain of each module.

It will be appreciated that a particular advantage of an arrangement similar to that shown in FIGS. 5 and 6, is that a real modulated signal may be used as a reference, that is to say, a data traffic signal either received or transmitted may be used as a reference in such a way that each transceiver module and the array of transceiver modules can be calibrated during operation and without need to transmit or emit a particular test signal. It will be appreciated that use of a test signal is possible but that use of a test signal in addition to usual data traffic may compromise the standard compliance of a transmitted signal, or act to impair and disturb signal quality for end users.

It will be appreciated that use of a real modulated traffic signal is particularly advantageous in relation to a mobile telecommunications system in which standard compliance and extraordinarily high reliability and availability of an antenna system is required to maintain service to user equipment in a cell. A calibration scheme according to that described in relation to FIGS. 5 and 6 has the advantage that there is less impact on availability of the system and no downtime of the active antenna array is required in order to achieve calibration.

Furthermore, it will be appreciated that the necessary hardware effort for calibration is minimal. In the embodiments shown a minimum amount of RF hardware is required (namely a radio frequency comparator unit 400), as opposed to some other calibration techniques which require dedicated receiver and/or signal processor which typically require expensive additional hardware and computational resources. It will be appreciated that in some calibration schemes a receiver tuned to a particular transmission frequency maybe required.

A method as described in relation to the embodiments does not require the use of highly calibrated switches to sample or inject a test signal. Avoidance of the use of a switch can increase method accuracy since the phase accuracy of such switches involving four eight or more ports directly impacts measurement accuracy. Avoidance of the use of a switch can also assist to keep system costs down since accurate switches are expensive components.

Calibration system described in embodiments will be understood to be particularly scalable since each transceiver module contains its own dedicated calibration hardware with a minimal common unit.

Figure 7:
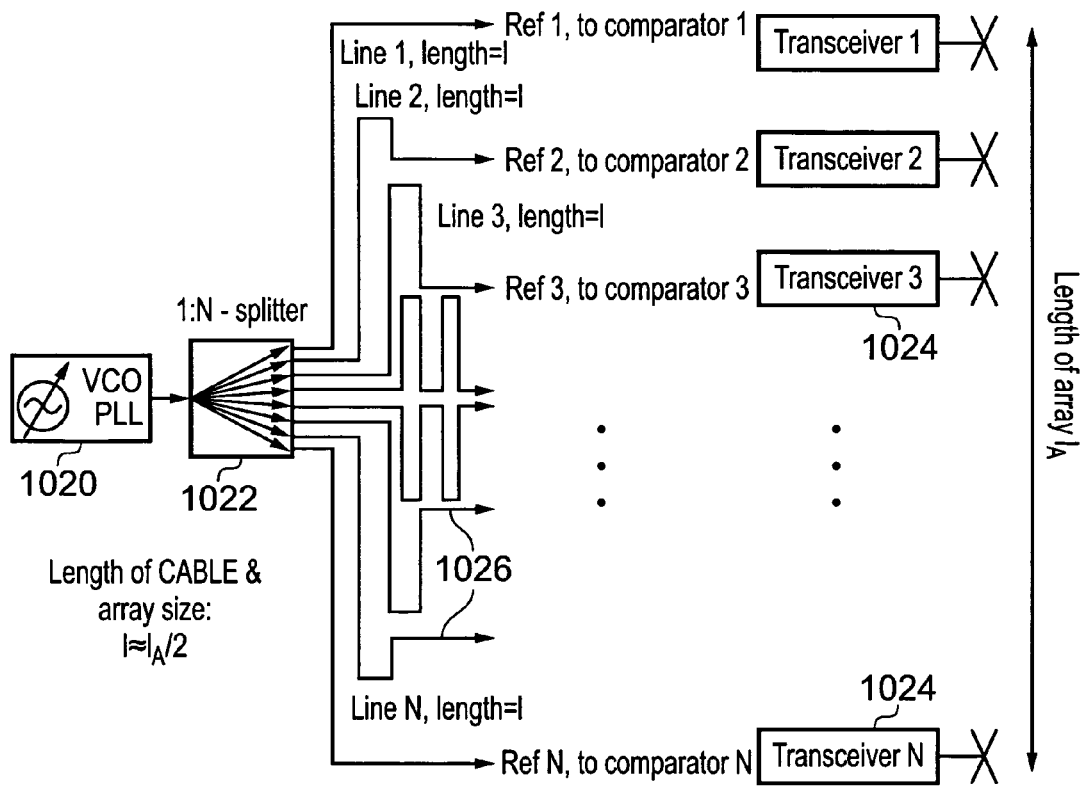
FIG. 7 is a schematic diagram of a means of distributing a reference signal to respective transceivers of an active antenna array, incorporating a star-distribution network.
Figure 8:
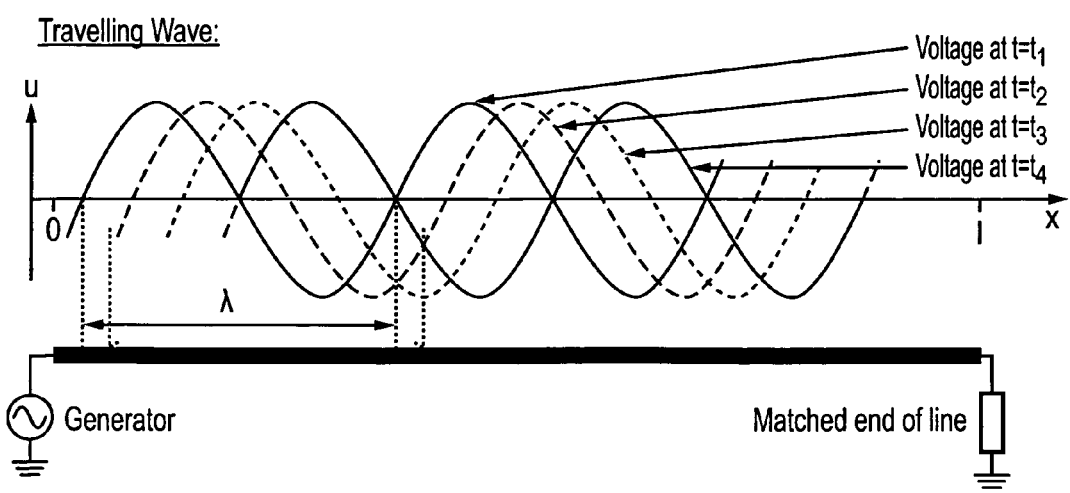
FIG. 8 is a schematic diagram of progression of a travelling electromagnetic wave along a transmission line length, having its free end terminated with a matching impedance.

Referring to FIG. 7, this shows a means of distributing a reference signal of phase and amplitude to the individual transceivers of an active antenna array. A centrally generated reference signal 1020 (VCO PLL) is split in an N-way-power divider 1022 (1:N-splitter) and connected to the reference input of each transceiver unit 1024 by respective transmission lines 1026 of equal length l. Length l is nominally equal to half the length of the array $l_A$. This forms a star-distribution network, and any change of the line length results in a change of the phase length, giving rise to disadvantages. This is due to the travelling nature of the wave propagation on the line: the phase change $\Delta\phi$ is proportional to the length $\Delta l$ which the wave travels along the line: $\Delta\phi=(360/\lambda line)\Delta l$, where $\lambda$ is the wavelength of the radiation in the transmission line. If one looks at a travelling wave at a certain snap-shot in time, the phase changes with the position along the transmission line, as indicated in FIG. 8. In FIG. 8, voltage values are shown existing along the line at time intervals $t_1$-$t_4$. As is well known the measured voltage value is dependent on the amplitude A and phase $\phi$ of the electromagnetic wave, and in the travelling wave of FIG. 8, the measured voltage will vary, with time, at each point on the line between +A and −A. In FIG. 8, the line length is terminated with the matching impedance of the transmission line, so that all the energy of the travelling wave is absorbed. If, however, a line length is terminated with an impedance other than a matching impedance, then a standing wave system may be set up.

Figure 9:
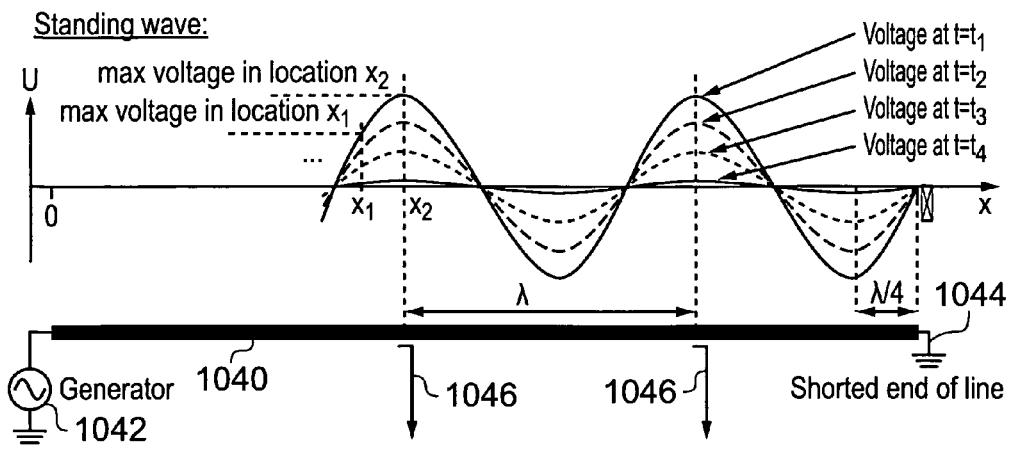
FIG. 9 is a schematic diagram of a standing electromagnetic wave along a transmission line, which has its free end terminated with a short circuit.

A standing wave arrangement is shown in FIG. 9. Such a standing wave can be generated along a line 1040 by feeding it with a signal 1042 from one end and shorting the signal at the other end 1044. This short enforces a voltage-null at the end of the line. The same energy that travels along the line is fully reflected at the short and travels backwards towards the source. If the line is lossless (or reasonable low loss), this leads to a standing wave on the line. Thus, the voltage value at any point along the line now depends on time, but the phase of the wave does not vary along the line, rather the amplitude A of the electromagnetic wave varies cyclically along the length of the line, between maxima and minima, (positive and negative peaks), the maxima being spaced apart one wavelength $\lambda$ of the wave, as shown. The first minimum occurs at a distance of $\lambda/4$ from the shorted end. At any given point along the line e.g. ×1 and ×2 the amplitude is different. The maximum voltage occurs at the same point in time as the minimum.

If the voltage on the line is now sampled by couplers 1046 with a low coupling coefficient in order not to interfere with the standing wave, then the maximum at each coupler output occurs at the same time (even they may differ in amplitude). If it ensured that each coupler is spaced in a distance of 1$\lambda$, where $\lambda$ is the wavelength of the radiation in the transmission line, then it is also ensured, that the amplitude at each coupler output is equal. If different amplitudes are desired, not necessarily equal, other distances than $\lambda$ can be chosen.

Such an arrangement of couplers attached to a line having a standing wave, may be used to transmit an amplitude and phase reference signal to the individual antenna elements of an active array system. Each coupler is attached to a respective transceiver by a short length of cable, of accurately known length. One advantage of such an arrangement is that it avoids the strict requirements of mechanical accuracy of the star distribution arrangement of FIG. 7. To minimize the amplitude difference between coupling or tapping points, the couplings may be spaced in a distance of $d=(N\lambda+\lambda/4)$ from the shorted end; this places each coupling in a voltage-peak of the standing wave. Since the voltage distribution along the line follows a sinusoidal function, and the derivative of the sinusoidal function near the maximum/minimum value is zero, the sensitivity of the amplitude of the coupled signal to the physical position of the coupling point is minimal.

Such an arrangement may overcome some shortcomings of a star-distribution arrangement, since the reduced dependence of the phase reference on the physical location of the coupling point along the line reduces the manufacturing cost and increases the accuracy of a system using a standing wave line as compared to a star-network. The signal may be transported from the coupling port to the reference comparator in the respective transceiver by a much shorter cable (e.g. in the order of several cm instead of several ten cms of a star network) and therefore be manufactured much more precisely. Due to the shorter cable lengths, the costs of the cables/line between the reference-line and the comparator are also reduced. The dependence of the amplitude of the coupled signal is minimized by placing the coupling ports at distances $d=(N\lambda+\lambda/4)$. For example, at 2 GHz and a Teflon filled line, a misplacement of the coupling point from the voltage maximum of +/−5 mm corresponds to a shift of 16.8°. With cos (16.8°)=0.95 this reduces the coupled amplitude by 20*log (0.95)=0.38 dB, which is about half of the permitted tolerance in amplitude accuracy for mobile communication antennas. Therefore the required mechanical accuracy has been reduced from a sub-mm-level tolerance to a level of several mm tolerance. It is much easier to achieve a sub-mm- or mm-accuracy on a short connection line between the standing wave line and the transceiver than on a line which is orders of magnitude longer, as in a star-network.

Figure 10A:
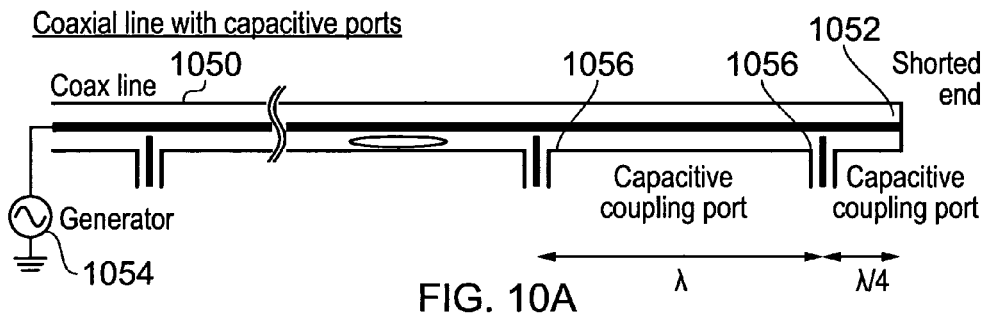
FIGS. 10a, 10b, and 10c are diagrammatic views of a length of transmission line with coupling points formed by capacitive coupling ports, for use in one embodiment.
Figure 10B:
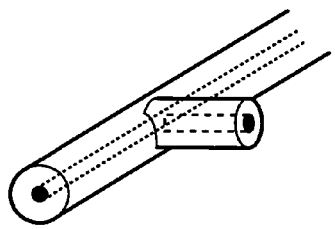
Figure 10C:
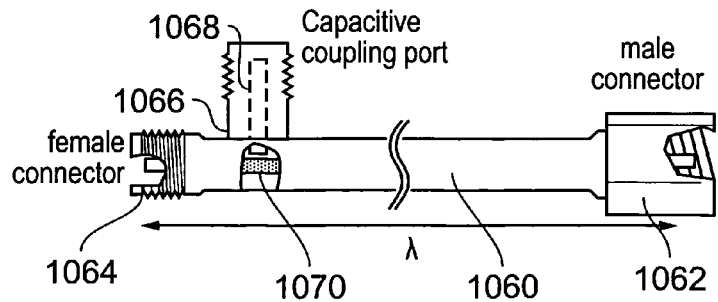

In FIGS. 10a, 10b, and 10c a form of coaxial line is shown, which is incorporated a distribution arrangement for amplitude and phase reference signals. In FIG. 10a, a transmission line, which is a coaxial line 1050 with a shorted free end 1052, is coupled to a reference source 1054. The line has a series of spaced capacitive coupled coaxial coupling or tapping ports 1056. A perspective view of a coupling port is shown in FIG. 10b. In FIG. 10c, a part-sectional view of a physical implementation of the transmission line is shown, comprising a length of air-filled coaxial line 1060, which has a length equal to one wavelength λ of the transmission signal (a 2 Ghz signal has a wavelength of the order of 15 cm in free space). One end has a male coupling connector 1062, and the other end a female coupling 1064, for coupling to identical sections of coaxial line, in order to provide a composite line of desired length. The length 1060 has a capacitive coupling port 1066, having an electrode pin 1068 which is adjustable in its spacing from a central conductor 1070. The coupling coefficient can be tuned to a desired value by the length of the coupling pin protruding into the standing wave line.

In the illustrated case of the standing wave line filled with air, the distance between the ports 1056 is $\lambda0=c0/f$ with $\lambda0$ being the wavelength in free space. In antenna arrays the distance of antenna elements is usually between 0.5λ0 and 1λ0, so that no gratings lobes occur in the array-pattern. In mobile communication antenna arrays this distance is usually in the order of ~0.9λ0. It is beneficial, that the distance between the coupling-ports for the reference signal matches the element distance, so the length of the wave guide that connects the coupling ports with the comparator-input is minimized. This is possible with the invention, by adapting the effective dielectric permittivity ∈eff used in the standing wave line such, that the physical length lc between the couplings equals approximately the element distance d between the antenna elements: $0.9\lambda0=d\approx\lambda0/(\text{square root}(\in\text{eff}))$. This is possible by using e.g. foam-material in the coaxial line as a dielectric and adjusting the dielectric permittivity by the density of the foam.

Figure 11:
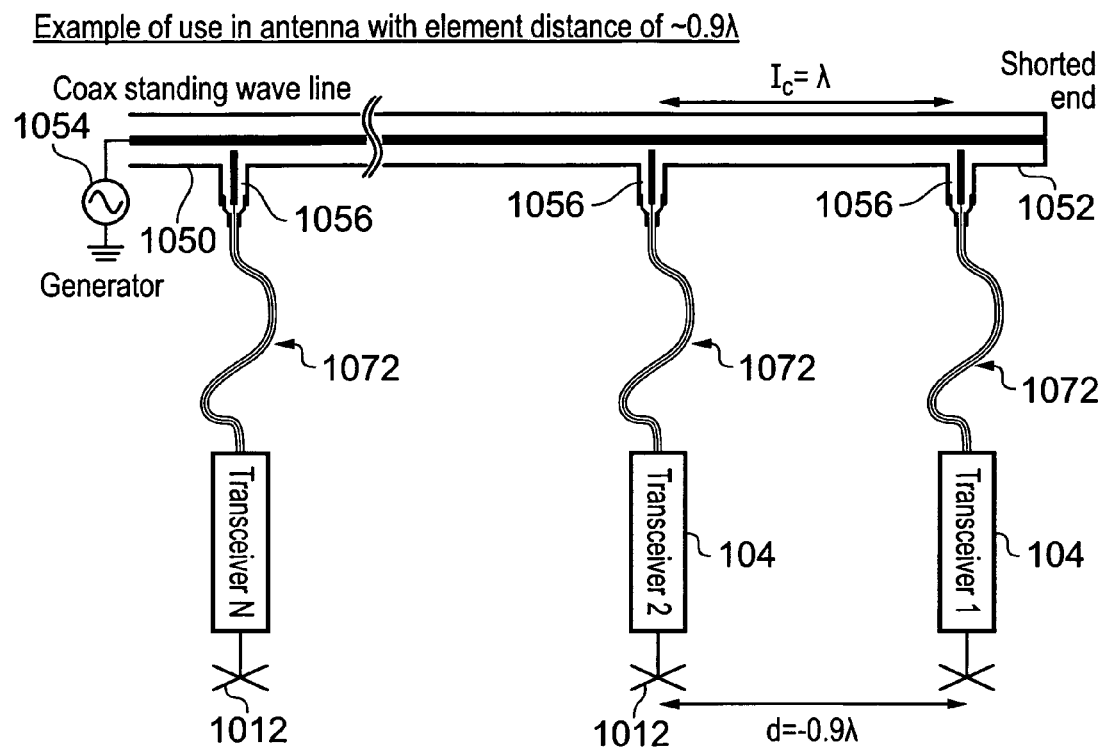
FIG. 11 is a schematic view of a feed arrangement of a reference signal to transceiver elements of an active antenna, in accordance with one embodiment.

FIG. 11 shows an embodiment of a distribution arrangement for reference signals of amplitude and phase to an active antenna system. The embodiment incorporates the coaxial line of FIG. 10, and similar parts to those of earlier Figures are denoted by the same reference numeral. In this embodiment the coupling or coupling ports 1056 are separated by an effective distance of 0.9λ, and each coupling port 1056 is connected by a short (of the order of a few cms, and short in relation to the length of line 1050) flexible coaxial cable 1072 to a respective transceiver (radio) element 4, which includes a comparator 10100 and which is coupled to an antenna element 1012. The lengths of the cables 1072 are precisely manufactured to be equal.

Figure 12:
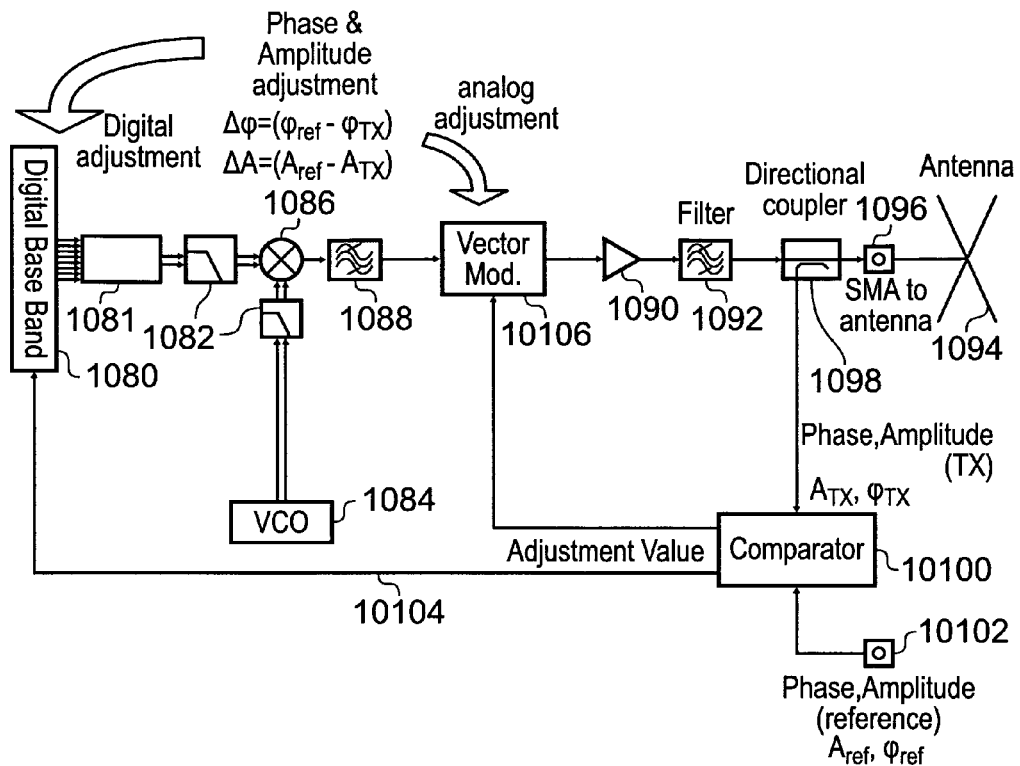
FIG. 12 is a schematic block diagram of a means for phase and amplitude adjustment within a transceiver element of the active array of FIG. 11.

The arrangement for processing the phase and amplitude reference signal within a transceiver (radio) element is shown in FIG. 12. A Digital baseband unit 1080 provides signals, which include digital adjustment data, to a DAC 1081, which provides a transmission signal for up-conversion in an arrangement comprising low-pass filters 1082, VCO 1084, mixer 1086, and passband filter 1088. The up-converted signal is amplified by power amplifier 1090, filtered at 1092, and fed to antenna element 1094 via an SMA connector 1096. To achieve phase calibration and adjustment, a directional coupler 1098 senses the phase and amplitude A, ψ of the output signal. This is compared in a comparator 10100 with phase and amplitude references $A_{ref}$, $\psi_{ref}$ at 10102, to provide an adjustment value 10104 to base band unit 1080. Alternatively, if analog adjustment is required, a vector modulation unit 10106 is provided in the transmission path. Thus, the comparator output 10104 is fed back either to a digital phase shifter and adjustable gain block 1080 or an analog phase shifter and gain block 10106, to adjust the phase and amplitude of the transmitted signal until its phase and amplitude matches the reference value.

The arrangement of capacitive coupling points of FIG. 10, that is simple envelope detectors for the standing wave detection, may leave a 180° phase ambiguity. This ambiguity may be resolved by employing two similar standing wave lines, working with same frequency signals, but fed with, e.g., 90° phase difference (i.e., T/4 time difference). Then, detection can comprise using two detectors against ground, or using one detector between the two lines.

An advantage of the distribution means of embodiments of the standing wave line is that it is scalable: the line can be designed as a single mechanical entity, or as a modular system, which is composed of several similar elements, which can be connected to each other. If more coupling points are required, the line length is increased by simply adding more segments.

Figure 13:
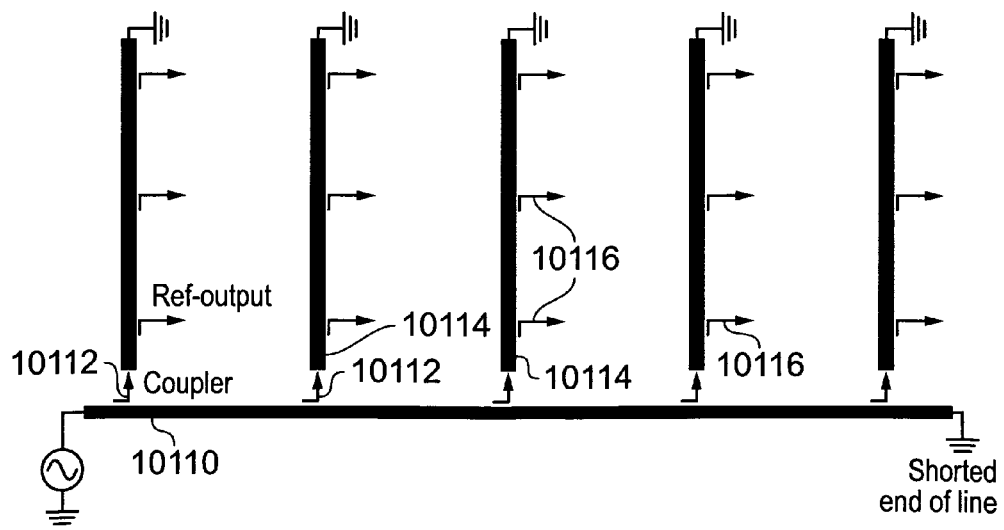
FIG. 13 is a schematic diagram of an alternative means of distributing a reference signal to transceivers in an active antenna array embodiment, forming a distribution arrangement for 2-D arrays.

In a modification, a distribution system for 2-dimensional arrays is provided. This is shown in FIG. 13, where a first line 10110, as shown in FIG. 10, is coupled at each coupling point 10112 to further coaxial lines 10114, each line 10114 being disposed at right angles to line 10110, and each line 10114 being as shown in FIG. 10 and having further coupling points 10116. Coupling points 10116 are connected to respective transceiver elements of a two dimensional active array.

In a further modification, by choosing a symmetrical implementation of the coupling points about the mid-point of the standing wave line, the accuracy can be improved further. Any error occurring in phase or amplitude is now symmetrical about the center of the array. If any phase or amplitude error occurs now along the reference coupling points (e.g. due to aging effects of the line), the symmetry of the generated beam is nevertheless ensured and no unwanted beam tilt effect occurs. Further, a temperature gradient along an active antenna array does not affect phase accuracy of the signals distributed to the respective antenna radiator modules. In practical operation, the uppermost antenna can easily experience an ambient temperature 20-30 degrees higher than the one of the lowest element. This can cause a few electrical degrees phase shift difference in a coaxial cable.

Thus a standing wave distribution network may provide the following advantages:

Scalability (in 1D and 2D). It may therefore be ideal for the design of antenna arrays of varying sizes, depending on the required gain, output power and beam width of the system.

The required mechanical accuracy may be reduced theoretically completely if it is used for phase reference distribution. In cases where it is used also as an amplitude reference, the required mechanical accuracy is decreased from a sub-mm-level to a level of several mm.

The cost, weight and volume of such a reference distribution is reduced.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. An active transceiver array for a wireless telecommunications network comprising:
   a central processing unit and a plurality of calibratable transceiver modules;
   the central processing unit comprising a primary signal generation unit;
   each transceiver module comprising:
   a transceiver chain operable to process a primary signal and generate a processed primary signal;
   a comparator unit operable to compare said primary signal and said processed primary signal to determine a transceiver chain error induced by said transceiver chain in said processed primary signal; and
   a correction unit which uses the transceiver error to correct said primary signal to be processed by said transceiver chain;
   wherein each transceiver chain comprises a digital connection to the central processing unit, a digital to analog converter and an antenna element; and
   wherein each module further comprises a coupling, operable to couple the transceiver chain to the comparator unit, the coupling being provided between the digital to analog converter and the antenna element.

2. An active transceiver array according to claim 1, wherein the primary signal generation unit is operable to generate a different primary signal for each of said plurality of transceiver modules.

3. An active transceiver array according to claim 1, further comprising a phase stable distribution element operable to distribute said primary signal to each of said plurality of transceiver modules.

4. An active transceiver array according to claim 3, wherein said phase stable distribution element is operable to distribute said primary signal to said comparator unit of each of said plurality of transceiver modules.

5. An active transceiver array according to claim 3, wherein said phase stable distribution element is operable to distribute the same said primary signal to said comparator unit of each of said plurality of transceiver modules.

6. An active transceiver array according to claim 3, wherein said phase stable distribution network comprises a standing wave line.

7. An active transceiver array according to claim 1, wherein said correction unit comprises a digital signal modification unit.

8. An active transceiver array according to claim 1, wherein said correction unit comprises an RF phase and amplitude adjuster.

9. A calibratable transceiver module for use in an active transceiver array in a wireless telecommunications network, comprising:
   a transceiver chain operable to process a primary signal and generate a processed primary signal;
   a comparator unit operable to compare said primary signal and said processed primary signal to determine a transceiver chain error induced by said transceiver chain in said processed primary signal; and
   a correction unit which uses the transceiver error to correct said primary signal to be processed by said transceiver chain;
   wherein the transceiver chain comprises a digital to analog converter, an antenna element, and a digital connection to a central processing unit; and wherein the module further comprises a coupling, operable to couple the transceiver chain to the comparator unit, the coupling being provided between the digital to analog converter and the antenna element.

10. A method of calibrating an active transceiver array in a wireless telecommunications network comprising a plurality of transceiver modules and a central processing unit comprising a primary signal generation unit;

said method comprising the steps, for each module, of:

processing a primary signal in a transceiver chain to generate a processed primary signal;

comparing said primary signal with said processed primary signal using a comparator unit to determine a transceiver chain error induced by said processing of said primary signal by said transceiver chain; and correcting said primary signal to be processed by said transceiver chain using said determined transceiver chain error;

wherein each transceiver chain comprises a digital connection to the central processing unit, a digital to analog converter and an antenna element; and wherein each module further comprises a coupling, operable to couple the transceiver chain to the comparator unit, the coupling being provided between the digital to analog converter and the antenna element.

11. A method according to claim 10, wherein said primary signal comprises a traffic signal.

12. A method according to claim 10, wherein the steps are performed consecutively for each module forming part of the transceiver array.

13. A method according to claim 10, wherein said primary signal comprises a sinusoidal test signal, and said method further comprises the steps of:

sweeping said sinusoidal test signal in frequency and, based on said determined transceiver chain error, determining a phase length of said transceiver chain.

* * * * *